United States Patent
Kang et al.

(10) Patent No.: US 10,326,321 B2
(45) Date of Patent: Jun. 18, 2019

(54) STATOR AND MOTOR USING THE SAME

(71) Applicant: LG Innotek Co., Ltd., Seoul (KR)

(72) Inventors: Young Gu Kang, Seoul (KR); Yong Joo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 452 days.

(21) Appl. No.: 15/163,265

(22) Filed: May 24, 2016

(65) Prior Publication Data

US 2016/0352160 A1 Dec. 1, 2016

(30) Foreign Application Priority Data

May 28, 2015 (KR) .................. 10-2015-0075386

(51) Int. Cl.
  *H02K 11/00* (2016.01)
  *H02K 1/14* (2006.01)
  *H02K 3/52* (2006.01)
  *H02K 11/215* (2016.01)
  *H02K 1/27* (2006.01)
  *H02K 3/04* (2006.01)

(52) U.S. Cl.
  CPC .......... *H02K 1/14* (2013.01); *H02K 1/2706* (2013.01); *H02K 3/04* (2013.01); *H02K 3/521* (2013.01); *H02K 3/522* (2013.01); *H02K 11/215* (2016.01); *H02K 2203/09* (2013.01); *H02K 2203/12* (2013.01)

(58) Field of Classification Search
  CPC ...... H02K 1/14; H02K 11/215; H02K 1/2706; H02K 3/04; H02K 3/521; H02K 3/522; H02K 2203/09; H02K 2203/12

USPC .................................................. 310/71, 194
See application file for complete search history.

(56) References Cited

U.S. PATENT DOCUMENTS

| 9,800,112 B2* | 10/2017 | Egami ................ H02K 3/522 |
| 2010/0244597 A1* | 9/2010 | Sugiyama ............ H02K 3/522 310/71 |
| 2013/0043743 A1* | 2/2013 | Kim .................... H02K 3/34 310/43 |
| 2014/0246934 A1* | 9/2014 | Egami .................. H02K 3/522 310/71 |

(Continued)

FOREIGN PATENT DOCUMENTS

| DE | 112011100325 T5 | 10/2012 |
| JP | 2008-289325 A | 11/2008 |

(Continued)

OTHER PUBLICATIONS

Extended European Search Report dated Oct. 11, 2016 in European Application No. 16165198.9.

(Continued)

*Primary Examiner* — Thanh Lam
(74) *Attorney, Agent, or Firm* — Saliwanchik, Lloyd & Eisenschenk (57) ABSTRACT

A stator which may enhance processability and manufacturing efficiency and a motor using the same are provided according to an embodiment of the present invention. Particularly, a stator which includes a plurality of unit stator cores which are provided with a tooth protruding from a head portion, an insulator coupled to the unit stator core, and a guide portion having a terminal mounting groove provided at an upper end of the insulator, is provided.

8 Claims, 9 Drawing Sheets

(56) References Cited

U.S. PATENT DOCUMENTS

2015/0061431 A1 3/2015 Egami et al.

FOREIGN PATENT DOCUMENTS

| JP | 5173617 | B2 | 4/2013 |
| JP | 5256669 | B2 | 8/2013 |
| JP | 2014-003842 | A | 1/2014 |
| WO | WO-2011/108734 | A1 | 9/2011 |
| WO | WO-2014061276 | A1 | 4/2014 |

OTHER PUBLICATIONS

Communication pursuant to Article 94(3) EPC dated Jun. 26, 2017 in European Application No. 16165198.9.

\* cited by examiner

STATOR AND MOTOR USING THE SAME

CROSS-REFERENCE TO RELATED APPLICATION

This application claims the benefit under 35 U.S.C. § 119 of Korean Patent Application No. 10-2015-0075386, filed May 28, 2015, which is hereby incorporated by reference in its entirety.

BACKGROUND

1. Field of the Invention

The present invention relates to a stator capable of enhancing processability and manufacturing efficiency, and a motor using the same.

2. Discussion of Related Art

A motor is an apparatus which implements driving power by an interaction between a stator and a rotor.

Such a motor may be classified as a variable voltage motor which is a direct current system and a three-phase induction motor which is an alternating current system.

For instance, the motor is used as a traction motor which implements a traction force in systems such as an elevator, a vehicle, and the like. In addition, the motor is used as an electronic power steering system (EPS) to ensure steering stability of a vehicle.

Among these, the EPS enables a driver to drive safely by ensuring turning stability and providing quick restoring force because an electronic control unit (ECU) drives the motor according to driving conditions sensed from a vehicle speed sensor, a torque angle sensor, a torque sensor, and the like. The EPS enables the driver to perform a steering operation with less power as the motor supplements the torque of a steering wheel that the driver operates.

For the above-described motor, a brushless direct current (BLDC) motor is used.

A major portion of the BLDC motor is formed by a stator and a rotor, and a coil is wound in the stator and a magnet is coupled to the rotor and the stator and the rotor electromagnetically interact with each other to rotate the rotor. Such a stator is formed by a unit core and a coil, and recently a plurality of segmented cores connected in an annular shape is used to form the stator.

In the case, when a coil which protrudes from an upper portion of the stator is coupled with a neutral point terminal, an injection-molded part of an insulating material needs to be separately manufactured and equipped to fix the neutral point terminal. Accordingly, subsidiary processes such as an injection material, an injection process, a coupling process and the like increase which leads to a degradation of manufacturing efficiency.

SUMMARY OF THE INVENTION

The present invention is directed to providing an efficient structure of a stator implemented without a separate fixing process or injection process of an insulating material by providing a guide portion in which a neutral point structure is directly mountable at an insulator itself, which is coupled to a stator core, and implementing a neutral point terminal member inserted in and coupled to the guide portion.

The technical objectives of the inventive concept are not limited to the above disclosure, and other objectives may become apparent to those of ordinary skill in the art based on the following descriptions.

One aspect of the present invention provides a stator which includes a plurality of unit stator cores which are provided with a tooth protruding from a head portion, an insulator coupled to the unit stator core, and a guide portion having a terminal mounting groove provided at an upper end of the insulator.

The stator may further include a neutral point terminal member mounted on the terminal mounting groove and contact-coupled with an end portion of a coil wound around the unit stator core.

In addition, the neutral point terminal member may include a body portion fitted in and coupled to the terminal mounting groove, and a plurality of binding portions provided at the body portion and coupled with the end portion of the coil wound around the unit stator coil.

Preferably, the neutral point terminal member may be bent to form the binding portions as a structure which surrounds the end portion of the coil.

Here, the body portion and the binding portions may be provided as an integrated structure.

The neutral point terminal member may further include an anti-rotation protruding pattern coupled to an inner surface of the guide portion at a portion of the body portion.

Another aspect of the present invention provides a motor which includes a motor housing, and a stator and a rotor installed in the motor housing, wherein the stator includes a plurality of unit stator cores which are provided with a tooth protruding from a head portion, an insulator coupled to the unit stator core, a guide portion having a terminal mounting groove provided at an upper end of the insulator, and a neutral point terminal member mounted on the terminal mounting groove and contact-coupled with an end portion of a coil wound around the unit stator core, wherein the neutral point terminal member includes a body portion fitted in and coupled to the terminal mounting groove, and a plurality of binding portions provided at the body portion and coupled with the end portion of the coil wound around the unit stator core.

Here, the neutral point terminal member may further include an anti-rotation protruding pattern coupled to an inner surface of the guide portion at a portion of the body portion.

BRIEF DESCRIPTION OF THE DRAWINGS

The above and other objects, features and advantages of the present invention will become more apparent to those of ordinary skill in the art by describing exemplary embodiments thereof in detail with reference to the attached drawings, in which.

DETAILED DESCRIPTION OF EXEMPLARY EMBODIMENTS

As the present invention is amenable to various modifications and alternative forms of embodiments, a certain particular embodiment will be described in connection with drawings. It should be understood, however, that the intention is not to limit the invention to the particular embodiments described. The intention is to cover all modifications, equivalents, and alternatives falling within the technical spirit and scope of the invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In describing the embodiments, it should be understood that, when an element is referred to as being formed "on" or "under" another element, it may be directly "on" or "under" the other element or be indirectly formed with one or more intervening elements therebetween. In addition, when an element is referred to as being "on or under", the term encompasses both an orientation of above and below.

The terminology used herein to describe embodiments of the invention is not intended to limit the scope of the inventive concept. As used herein, the singular forms "a," "an," and "the" are intended to include the plural forms as well, unless the context clearly indicates otherwise. It should be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this inventive concept belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments of the present invention will be described in detail with reference to the accompanying drawings. In the description with reference to the accompanying drawings, like elements are designated by the same reference numerals regardless of drawing numbers, and duplicated descriptions thereof will be omitted.

Figure 1:
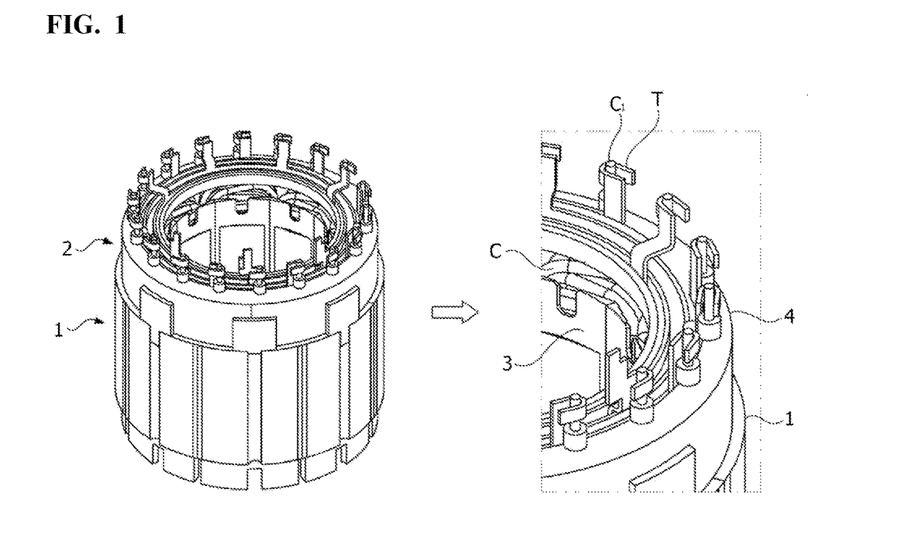
FIG. 1 is a view illustrating a structure of a stator applied to a basic motor.

FIG. 1 is a view illustrating a structure of a stator applied to a basic motor.

As illustrated in FIG. 1, an insulator 2 is equipped to a plurality of stator cores 3, and an end portion C1 of a coil C wound around the insulator 2 is disposed to protrude outside a stator 1.

In this case, a neutral point terminal T, which is coupled to the end portion C1 of the coil C exposed, is disposed at an upper portion of the stator 1. As illustrated in FIG. 1, a fixing member 4 such as an injection-molded plastic is essential for assembling the neutral point terminal T and securing insulation against the outside. Due to this, a process for injection molding is inevitable, which causes a process cost to increase.

Figure 2A:
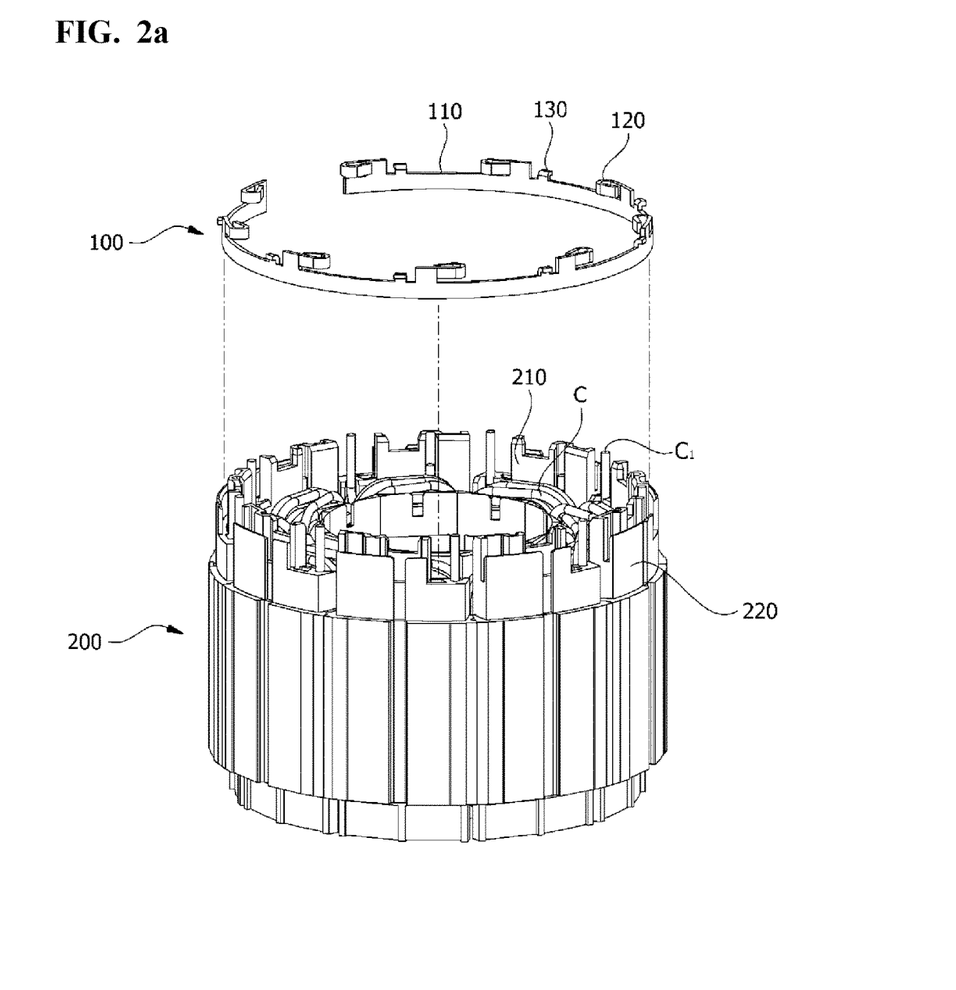
FIG. 2A is a disassembled perspective view illustrating a structure of a stator according to one embodiment of the present invention.
Figure 2B:
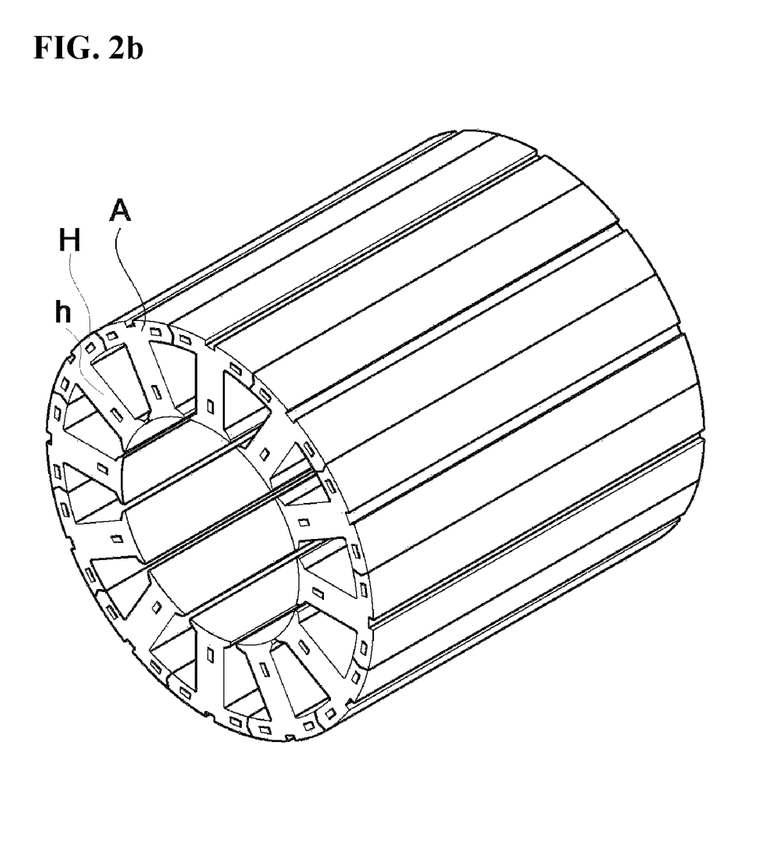
FIG. 2B is a view illustrating a combined structure of a unit stator core.
Figure 2C:
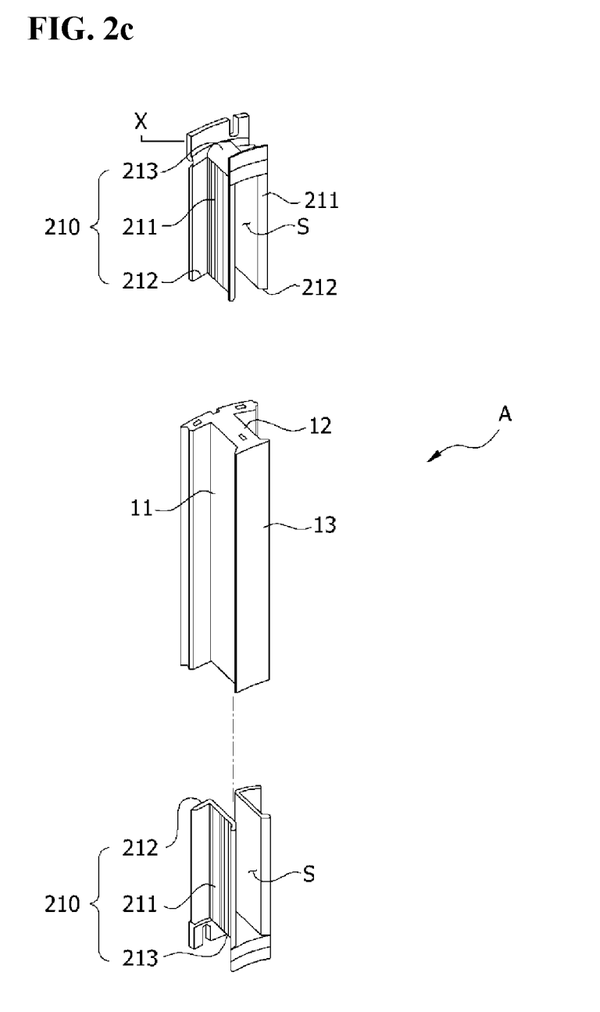
FIG. 2C illustrates how a unit stator core is coupled with an insulator.

FIG. 2A is a disassembled perspective view illustrating a structure of a stator 200 according to one embodiment of the present invention capable of resolving the above-described problem. FIG. 2B is a view illustrating a combined structure of a unit stator core, and FIG. 2C illustrates how a unit stator core is coupled with an insulator.

Figure 3:
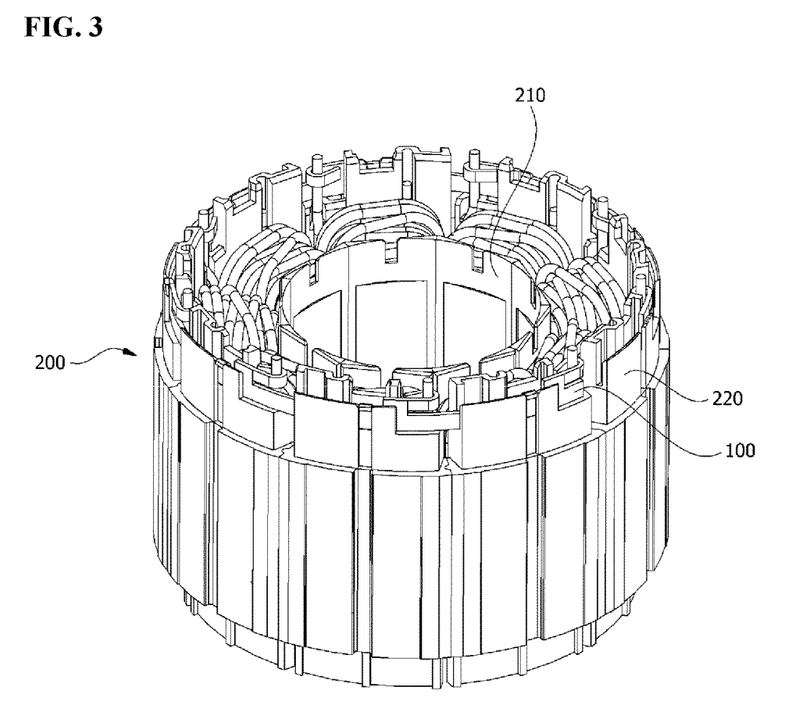
FIG. 3 is a coupled perspective view of FIG. 2.
Figure 4:
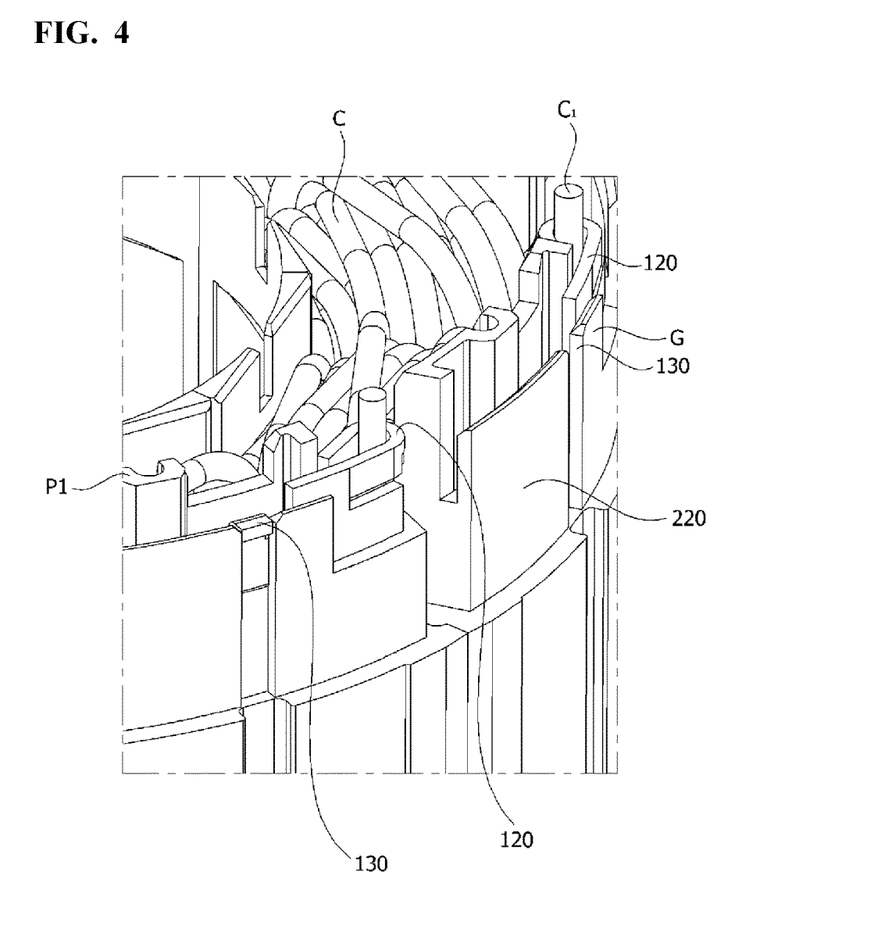
FIGS. 4 and 5 are enlarged views of main portions of FIG. 3.
Figure 5:
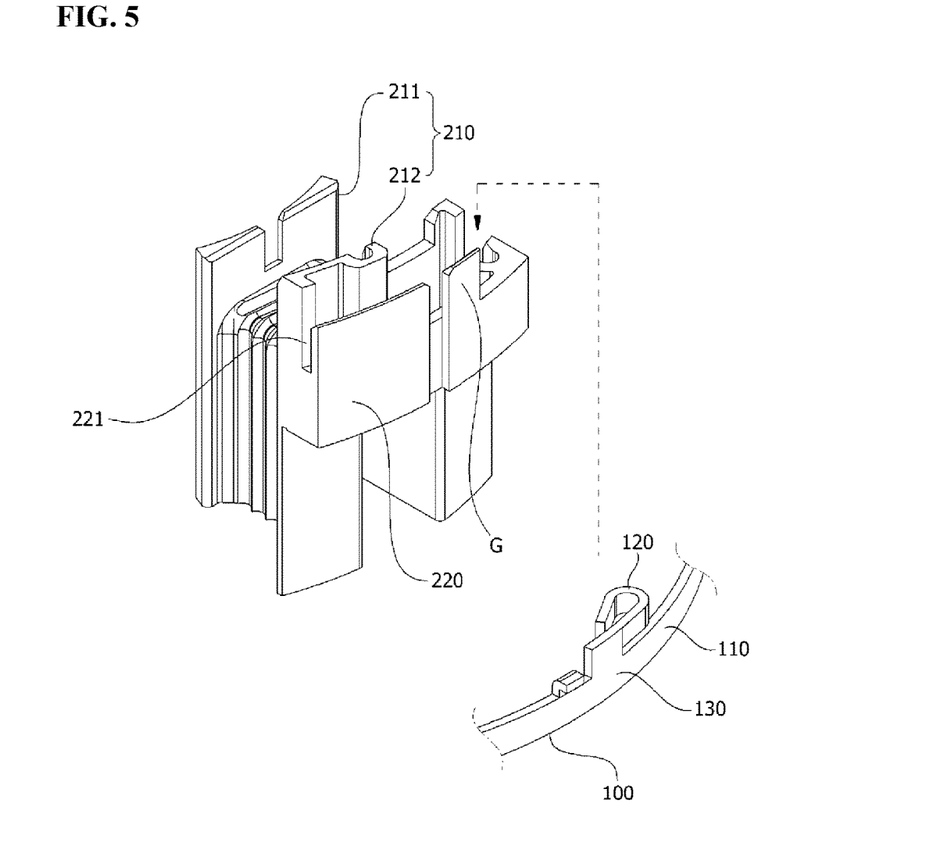

FIG. 3 is a coupled perspective view of FIG. 2, and FIGS. 4 and 5 are enlarged views of main portions of FIG. 3.

Referring to FIGS. 2 to 5, the stator 200 according to one embodiment of the present invention may be formed including a plurality of unit stator cores A, an insulator 210 coupled to the unit stator core A, and a guide portion 220 which has a terminal mounting groove 221 provided at an upper end of the insulator 210.

As illustrated in FIG. 2B, the plurality of unit stator cores A are disposed to be segmented and adjacent to each other.

As illustrated in FIG. 2B, the unit stator core A is a structure in which a tooth h is provided protruding from a head portion H, and is disposed in an annular structure to implement a stator.

Particularly, as illustrated in FIG. 2C, the insulator 210 is mounted to an outer circumferential surface of the unit stator core A in a form of a fitted-in coupling. As illustrated in FIG. 2C, the insulator 210 may be provided by coupling identical structures which are vertically separated and manufactured or may be manufactured as a single integrated structure.

In the insulator 210, a hollow S is formed therein, an insulator main body 213 in which a coil winding groove 211 is provided may be disposed at an outer surface thereof, and a coupling groove 212 coupled with another insulator may be provided at a lower portion thereof. Particularly, as illustrated in FIG. 2C, one embodiment of the present invention has a feature of implementing a structure which further includes the guide portion 220 at an outside of an upper end portion X of the insulator 210.

As illustrated in FIG. 2A, the guide portion 220 which is disposed at an upper portion of the insulator 210 and protrudes outwardly from the stator may be provided. Here, the guide portion 220 includes the terminal mounting groove 221 in which a neutral point terminal member 100 is inserted and coupled.

Through this arrangement, the neutral point terminal member 100 implemented as an integrated structure may be fitted in and coupled to the terminal mounting groove 221 of the guide portion 220 without providing a separate injection-molded insulating material 4 as described above in FIG. 1. Therefore, a manufacturing process is simplified, a material cost is saved, and structural stability and efficiency in maintenance may be ensured.

FIG. 3 is a perspective view illustrating a coupled state of FIG. 2A, FIG. 4 is an enlarged view illustrating a main portion of a guide portion and a neutral point terminal member of FIG. 3, and FIG. 5 is an enlarged view illustrating a main portion of a guide portion.

Referring to FIGS. 3 to 5, the guide portion 220 is provided as a structure protruding outwardly from an outside body P1 of the insulator 210 on which the coil C is wound.

As illustrated in FIG. 5, the guide portion 220 is implemented as a structure in which the terminal mounting groove 221 is formed so that the neutral point terminal member 100 is fitted in and coupled.

Specifically, the neutral point terminal member 100 is fitted in and coupled to the terminal mounting groove 221.

The neutral point terminal member 100 may include a body portion 110 and a plurality of binding portions 120. In addition, the neutral point terminal member 100 may further include a protruding pattern 130.

The body portion 110 is fitted in and coupled to the terminal mounting groove 221, and is formed to be bent to a predetermined curvature along an outer circumference of the stator.

The plurality of binding portions 120 are provided at the body portion 110 and are coupled with the end portion C1 of the coil C wound around the unit stator core A. That is, the binding portion 120 is implemented in a structure configured to contact-couple with the end portion C1 of the coil wound around the unit stator core A, and may be bent to form a structure which surrounds the end portion C1 of the coil.

The neutral point terminal member 100 is provided with the body portion 110 and the binding portion 120 as an integrated structure, which strengthens structural unity.

Particularly, the neutral point terminal member 100 is implemented as a structure which further includes an anti-rotation protruding pattern 130 coupled to an inner surface of the guide portion 220 at one area of the body portion 110. Thereby, the protruding pattern 130 prevents the neutral point terminal member 100 from rotating or being separated due to a rotary motion.

Figure 6:
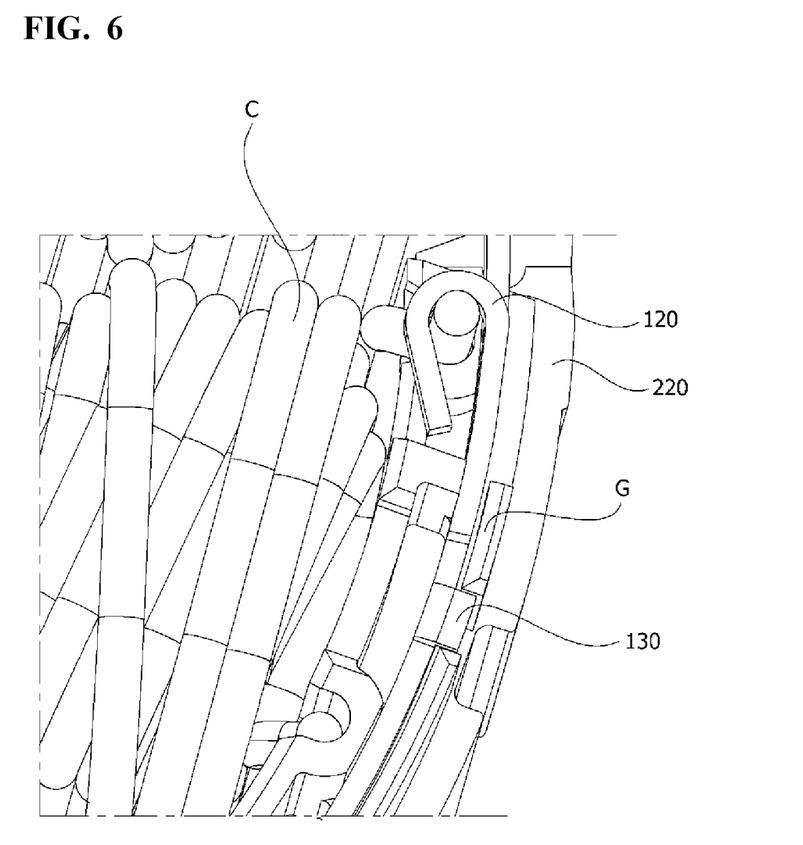
FIG. 6 is a top plan view of a combined structure of a neutral point terminal member.

FIG. 6 illustrates a top plan view of FIG. 3, and the neutral point terminal member 100 prevents its own rotation by the anti-rotation protruding pattern 130 being coupled as a structure which is hooked by a coupling protrusion G of the guide portion 220. That is, the structure of the anti-rotation protruding pattern 130 which is hooked by the coupling protrusion G prevents the neutral point terminal member 100 from its own rotation according to a rotary motion, thereby enabling a binding to be stably secured with the end portion C1 of the coil.

Hereinafter, referring to FIG. 7, an implementation sample of an electrically controlled power steering (EPS) motor in which the stator 200 for a motor according to one embodiment of the present invention is applied. However, the stator 200 according to the embodiment may be applied to various types of motors such as a traction motor which implement a traction force in systems such as an elevator, a vehicle, and the like.

Figure 7:
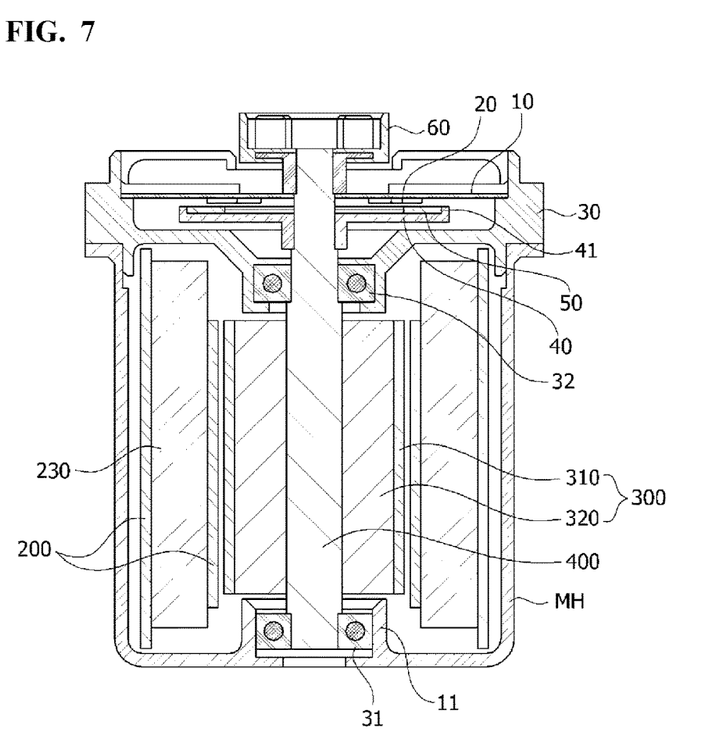
FIG. 7 is a conceptual diagram on an implementation sample of an electronic power steering (EPS) motor in which a stator for a motor according to one embodiment of the present invention is applied.

Referring to FIG. 7, the motor is provided with a motor housing MH and a bracket 30 coupled to the motor housing MH.

The motor housing MH may be formed as a shape in which an upper portion is open and a support duct 11 protrudes from a central portion of a lower surface. In addition, the bracket 30 is coupled to the upper portion of the motor housing MH to form an internal space. A first bearing 31 is installed at an inside of the support duct 11, and a second bearing 32 is installed at the bracket 30.

A rotating shaft 400 is disposed to be supported by and in contact with the first bearing 31 and the second bearing 32. As illustrated in FIG. 7, an upper portion of the rotating shaft 400 is supported by the second bearing 32 and a lower portion of the rotating shaft 400 is supported by the first bearing 31.

An upper end portion of the rotating shaft 400 passes through the bracket 30 and is disposed to protrude upward and be coupled to a mechanical device 60 connected to a steering shaft (not shown).

The stator 200 and a rotor 300 are installed in the motor housing MH. The rotor 300 includes a rotor core 320 coupled to the rotating shaft 400, and a magnet 310 coupled to an outer circumferential surface of the rotor core 320.

Although a structure in which the magnet 310 is coupled to the outer circumferential surface of the rotor core 320 is taken as an example in the present embodiment, an alternative structure in which the magnet 310 is inserted into the rotor core 320 may also be applied to the rotor 300.

The stator 200 is disposed between the magnet 310 and the motor housing MH, and may include the same structure as described above in FIG. 2A.

In the above-described structure of the motor, the rotating shaft 400 rotates as a magnetic field generated at the stator 200 and an electric field generated at the rotor 300 interact with each other.

A sensing plate 40 is coupled to the rotating shaft 400 and rotates therewith. In addition, a sensing magnet 50 is installed at the sensing plate 40.

Further, a printed circuit board (PCB) 10 is installed at the bracket 30, and a sensing device 20 may be installed at a position of the PCB 10 which faces the sensing magnet 50.

The sensing device 20 senses a degree of rotation of the sensing plate 40 on which the sensing magnet 50 is coupled and the rotating shaft 400 by sensing a degree of rotation of the sensing magnet 50.

According to the embodiment of the present invention, the neutral point terminal member is implemented as a structure that is inserted and coupled to the guide portion, which is provided so that the neutral point terminal structure can be directly mounted on the insulator itself, which is coupled to the stator core. Thereby, a manufacturing cost can be remarkably saved due to the efficient stator structure implemented without separate fixing process or an insulating material injection molding process.

Furthermore, the neutral point terminal member in an integrated structure which is fitted and coupled to an upper surface of the entire stator in an annular-shaped structure can supplementally strengthen the overall structural stability of each stator. In other words, because the neutral point terminal member in an annular structure is fitted and coupled to an upper surface of the stator formed by connecting a plurality of segmented cores in an annular shape, a structural stability of the stator can be strengthened.

While the invention has been shown and described with reference to certain exemplary embodiments thereof, it should be understood by those skilled in the art that various changes in form and details may be made therein without departing from the spirit and scope of the invention as defined by the appended claims. In addition, it should be understood that those differences associated with the modifications and changes are included in the scope of the present invention as defined in the scope of the claims described herein.

What is claimed is:
1. A stator comprising:
a plurality of unit stator cores, each unit stator core being provided with a tooth protruding from a head portion;
an insulator coupled to the unit stator cores;

a guide portion having a terminal mounting groove provided at an upper end of the insulator; and a neutral point terminal member comprising a body portion, a plurality of binding portions, and an anti-rotation protruding pattern formed at a portion of the body portion, wherein each binding portion of the plurality of binding portions has one end connected to the body portion and the other end disconnected from the body portion.

2. The stator of claim 1, wherein the neutral point terminal member is mounted on the terminal mounting groove and contact-coupled with an end portion of a coil wound around the unit stator cores.

3. The stator of claim 2, wherein the body portion is fitted in and coupled to the terminal mounting groove, and the plurality of binding portions is coupled with the end portion of the coil wound around the unit stator cores.

4. The stator of claim 3, wherein the neutral point terminal member is bent to form the binding portions as a structure which surrounds the end portion of the coil.

5. The stator of claim 4, wherein the body portion and the binding portions are provided as an integrated structure.

6. The stator of claim 3, wherein the anti-rotation protruding pattern is coupled to an inner surface of the guide portion.

7. A motor comprising:
a motor housing; and
a stator and a rotor installed in the motor housing,
wherein the stator includes:
a plurality of unit stator cores, each unit stator core being provided with a tooth protruding from a head portion;
an insulator coupled to the unit stator cores;
a guide portion having a terminal mounting groove provided at an upper end of the insulator; and
a neutral point terminal member mounted on the terminal mounting groove and contact-coupled with an end portion of a coil wound around the unit stator cores,
wherein the neutral point terminal member includes:
a body portion fitted in and coupled to the terminal mounting groove;
a plurality of binding portions coupled with the end portion of the coil wound around the unit stator cores, and
an anti-rotation protruding pattern formed at a portion the body portion,
wherein each binding portion of the plurality of binding portions has one end connected to the body portion and the other end disconnected from the body portion.

8. The motor of claim 7, wherein the anti-rotation protruding pattern is coupled to an inner surface of the guide portion.

* * * * *